United States Patent [19]

Brigham et al.

[11] Patent Number: 4,732,396
[45] Date of Patent: Mar. 22, 1988

[54] APPARATUS AND METHOD FOR SEALING A ROTATING SHAFT

[75] Inventors: Robert W. Brigham, West Lafayette, Ind.; Stephen Cirelli, El Dorado, Ark.; Nick T. Macchiarolo, El Dorado, Ark.; Paul D. Schiefelbein, El Dorado, Ark.

[73] Assignee: Great Lakes Chemical Corporation, West Lafayette, Ind.

[21] Appl. No.: 785,836

[22] Filed: Oct. 8, 1985

[51] Int. Cl.<sup>4</sup> .................... F16J 15/40; F16J 15/52; F16L 27/00

[52] U.S. Cl. ...................... 277/3; 29/526 R; 277/1; 277/12; 277/81 R; 277/212 FB; 285/226; 366/138; 366/349; 416/174; 416/244 B; 440/52

[58] Field of Search .......... 277/1, 12, 15, 29, 212 FB, 277/75, 32, 101, 88, 81 R, 3, 27, 97, 9, 32; 415/175, 110, 111, 112, 113; 416/174, 244 B; 285/299, 226; 251/335.3; 440/78, 76, 77, 49, 52; 29/526 R; 366/138, 349

[56] References Cited

U.S. PATENT DOCUMENTS

| | | | |
|---|---|---|---|
| 1,666,637 | 4/1928 | Aldrich et al. | 285/226 X |
| 2,297,302 | 9/1942 | Hornschuch | 277/81 X |
| 2,646,001 | 7/1953 | Ray | 277/88 X |
| 2,949,321 | 8/1960 | Tracy | 277/12 X |
| 3,000,389 | 9/1961 | Alsaser et al. | 285/226 X |
| 3,034,796 | 5/1962 | Wilk | 277/12 |
| 3,088,744 | 5/1963 | Ezekiel et al. | 277/15 X |
| 3,360,272 | 12/1967 | Blom et al. | 277/27 X |
| 3,395,645 | 8/1968 | Vilet | 415/175 X |
| 3,600,101 | 8/1971 | Oglesby et al. | 415/111 |
| 3,731,940 | 5/1973 | Spruiell | 277/3 X |
| 3,747,943 | 7/1973 | Dietzel et al. | 277/97 X |
| 4,103,899 | 8/1978 | Turner | 415/175 X |
| 4,128,248 | 12/1978 | Kabelitz et al. | 277/15 |
| 4,354,846 | 10/1982 | Eichinger | 440/52 |

FOREIGN PATENT DOCUMENTS 1386602  3/1975  United Kingdom ......... 277/212 FB

*Primary Examiner*—Allan N. Shoap
*Attorney, Agent, or Firm*—Kirkland & Ellis

[57] ABSTRACT

An apparatus and method for forming a fluid-tight seal at an aperture where a rotatable shaft passes through a barrier into a barred fluid. A mechanical seal is mounted on the rotatable shaft. A stationary portion of the mechanical seal is elastomerically joined to the barrier by an elastomeric joint to form a substantially fluid-tight chamber bounded by the mechanical seal, the elastomeric joint and the barrier. The stationary portion of the mechanical seal is sealingly positioned adjacent to the rotatable portion of the mechanical seal. The elastomeric joint absorbs relative radial and axial motion between the barrier and the mechanical seal. The chamber is flushed with a flushing fluid. The stationary portion of the mechanical seal is rigidly anchored to the stationary shaft drive housing. The rotatable portion of the mechanical seal is attached to the rotatable shaft at such a distance from a stationary drive shaft housing that the resistance of the shaft to radial deflection is substantially maximum.

17 Claims, 3 Drawing Figures

APPARATUS AND METHOD FOR SEALING A ROTATING SHAFT

BACKGROUND OF THE INVENTION

A. Field of the Invention

This invention relates to the formation of a fluid-tight seal at an aperture where a rotatable shaft passes through a barrier means into a barred fluid.

B. Prior Art

In rotatable shaft applications where the shaft passes through a barrier, such as rotatable shafts in pumps, fans, compressors, agitated tanks, boat propeller shafts and the like, it is often beneficial or necessary to seal the aperture where the shaft passes through the barrier into a barred fluid. For example, reactors, tanks and vessels handling toxic or corrosive chemicals are often agitated to mix and suspend solids. The chemical is the barred fluid in the tank which must be sealed from the atmosphere. Or, for example, the body of water through which a boat is propelled is the barred fluid which must be sealed from the propeller drive.

Radial and axial movement of the rotatable shaft relative to a stationary barrier impedes effective sealing. Misalignment of the shaft relative to the barrier and radial or axial movement of the barrier relative to an aligned shaft also impede effective sealing. Axial compression and extension of the shaft relative to the barrier are impediments to an effective seal as well. The nature of the barred fluid material must also be considered in designing a shaft seal.

Packing glands and mechanical seals are typically employed to seal rotatable shafts. A stationary portion of the gland or seal is attached to the barrier and a rotatable portion of the gland or seal is attached to the shaft and allowed to rotate with the shaft.

Packing glands provide a seal by radial expansion of a lubricated deformable material such as braided or layer-wound rubber, plastic, fiber or a combination of these. Radial expansion is accomplished by axially compressing rings made of the deformable material which are stacked against the rotatable shaft in a restricted space. The packing gland must be periodically lubricated. Because it is a rubbing contact seal, heat is generated by friction with the rotating shaft, and a cooling jacket surrounding the packed deformable material is often necessary. The utility of packing glands is limited by the type of deformable material used. The packing gland will leak or fail if the packing material corrodes, loses its compressibility, does not retain its integrity at high temperatures, is not resilient enough to withstand the operating deflections of the shaft, or is insufficiently lubricated. Packing glands are typically employed to seal boat propeller shafts.

A mechanical seal is not in rubbing contact with the shaft, but rather employs at least two flat ring-shaped surfaces: one mounted on the barrier in a stationary non-rotating position, and the other attached to and rotatable with the shaft. The two surfaces or faces are extremely close to each other and may have a thin film of lubricant between them or be self-lubricating (one surface may be carbon or Teflon, for instance). The faces are orientated at right angles to the axis of shaft rotation. The pressure forcing the faces together must be great enough to maintain their proximity yet not so great as to close the gap and prevent rotation. A typical size gap is on the order of 0.00001 inches. The gap must be kept free from all foreign material to maintain the gap size, prevent abrasion of the surfaces, and avoid leaking. If the gap is permitted to open to even 0.001 inches, abrasives may penetrate and leaking may occur.

As the rotatable face rotates with the shaft, any radial or axial movement of the shaft relative to the barrier forces the sealing faces apart. As the stationary face is fixed relative to the barrier any radial or axial movement of the barrier relative to the shaft also forces the sealing faces apart. For example, where a mechanical seal is used in connection with an agitator shaft rotatable in a tank or reaction vessel made of fiberglass reinforced plastic, movement of the tank nozzle where the shaft enters the tank can be extreme because the fiberglass reinforced plastic tank has a low modulus of elasticity and actually flexes or wobbles during agitation. In the manufacture of glass lined steel tanks or reaction vessels, the high firing temperature can warp the tank nozzle making it extremely difficult to center the shaft in the nozzle. The rotatable face of a mechanical seal attached to a misaligned shaft will be forced away from the stationary face attached to the misaligned tank nozzle. Accordingly, insulating the mechanical seal faces from the separating forces of radial and axial movement of the rotatable shaft and stationary barrier decreases the likelihood of leakage or seal failure.

Attempts to insulate the seal faces of mechanical seals from the separating forces of axial and radial movement of the shaft and barrier have focused on altering the dimensions of the mechanical seal components. Mechanical seals have been improved by increasing the diameter and surface area of the seal faces which increases tolerance for radial motion.

Another method of insulating the seal faces from separating forces is the use of a double seal comprising two mechanical seals installed along the axis of the rotable shaft. Use of a double seal increases tolerance for axial motion. In a double seal two mechanical seals are positioned so that their rotatable faces are simultaneously forced against their respective stationary faces by one or more compression springs which are capable of absorbing some axial motion.

In yet another attempt to increase mechanical seal tolerance a "floating stationary unit" is employed. In a floating stationary unit the non-rotatable seal faces of a double seal are not truly stationary, but rather are permitted to float relative to the barrier while remaining aligned with the rotatable faces when the shaft is subjected to radial motion.

These advances in the field have afforded only minimal increases in tolerance. An example of a mechanical seal employing a floating stationary unit and offering the maximum tolerance available in the industry is the "Chesterton 222" manufactured by A. W. Chesterton Company of Stoneham, Mass. The Chesterton 222 tolerates a maximum of one eighth inch radial motion of the shaft at the point where the seal is installed on the shaft.

As noted above, in the chemical industry corrosive materials must often be sealed from leaking to the atmosphere. A mechanical seal used for this purpose is often exposed to the corrosives and accordingly is made, in part, of expensive corrosion resistant metals or metal alloys such as nickel, Hastelloy-C or tantalum.

The novel apparatus and method of the present invention overcomes the deficiencies of the prior art by insulating the seal faces of a mechanical seal from the separating forces of axial and radial shaft and barrier motion, by protecting the mechanical seal faces from abrasives, by stabilizing the stationary portion of the mechanical seal relative to the rotatable shaft, by stabilizing the rotatable portion of the mechanical seal relative to the stationary portion and thus making the seal self-centering, and by permitting the use of less expensive mechanical seals made of, for example, stainless steel even in corrosive applications.

It is an object of the present invention to insulate the seal faces of a mechanical seal from the separating forces of axial and radial shaft and barrier motion without altering the means by which a rotatable shaft is attached to the rotatable portion of a conventional mechanical seal.

It is a further object of the present invention to provide a mechanical seal assembly having a tolerance for axial and radial motion greater than the tolerance of a conventional mechanical seal.

It is a further object of the present invention to protect the seal parts of a mechanical seal from corrosives, abrasives and foreign materials.

It is yet a further object of the present invention to stabilize a mechanical seal relative to the rotatable shaft.

It is yet a further object of the present invention to stabilize the rotatable portion of a mechanical seal relative to the stationary portion.

It is yet a further object of the present invention to minimize the accuracy required to properly mount a shaft drive means for a rotatable shaft relative to the barrier through which the rotatable shaft passes by making the seal means self-centering.

It is yet a further object of the present invention to permit use of mechanical seals made of inexpensive non-corrosion resistant materials in corrosive applications.

These and other objects of the present invention will become apparent to those skilled in the art from the following description and accompanying drawings of the present invention.

SUMMARY OF THE INVENTION

The present invention provides an apparatus and method for forming a substantially fluid-tight seal at an aperture where a rotatable shaft means passes through a barrier means into a barred fluid. The apparatus comprises a mechanical seal means having at least one stationary portion sealingly positioned adjacent to at least one rotatable portion of the mechanical seal means. The rotatable portion is mounted on the rotatable shaft means for rotation therewith. An elastomeric joint means elastomerically joins the stationary portion of the mechanical seal means to the barrier means to form a substantially fluid-tight chamber bounded by the mechanical seal means, the elastomeric joint means, and the barrier means. The elastomeric joint means is adapted to absorb relative radial and axial motion between the barrier means and the mechanical seal means.

The method comprises the steps of mounting at least one rotatable portion of a mechanical seal means on a rotatable shaft and sealingly positioning at least one stationary portion of the mechanical seal means adjacent to the rotatable portion, and elastomerically joining the stationary portion of the mechanical seal means to the barrier means with an elastomeric joint means to form a substantially fluid-tight chamaber whereby the elastomeric joint means is adapted to absorb relative radial and axial motion between the barrier means and the mechanical seal means.

DETAILED DESCRIPTION OF THE INVENTION

Figure 1:
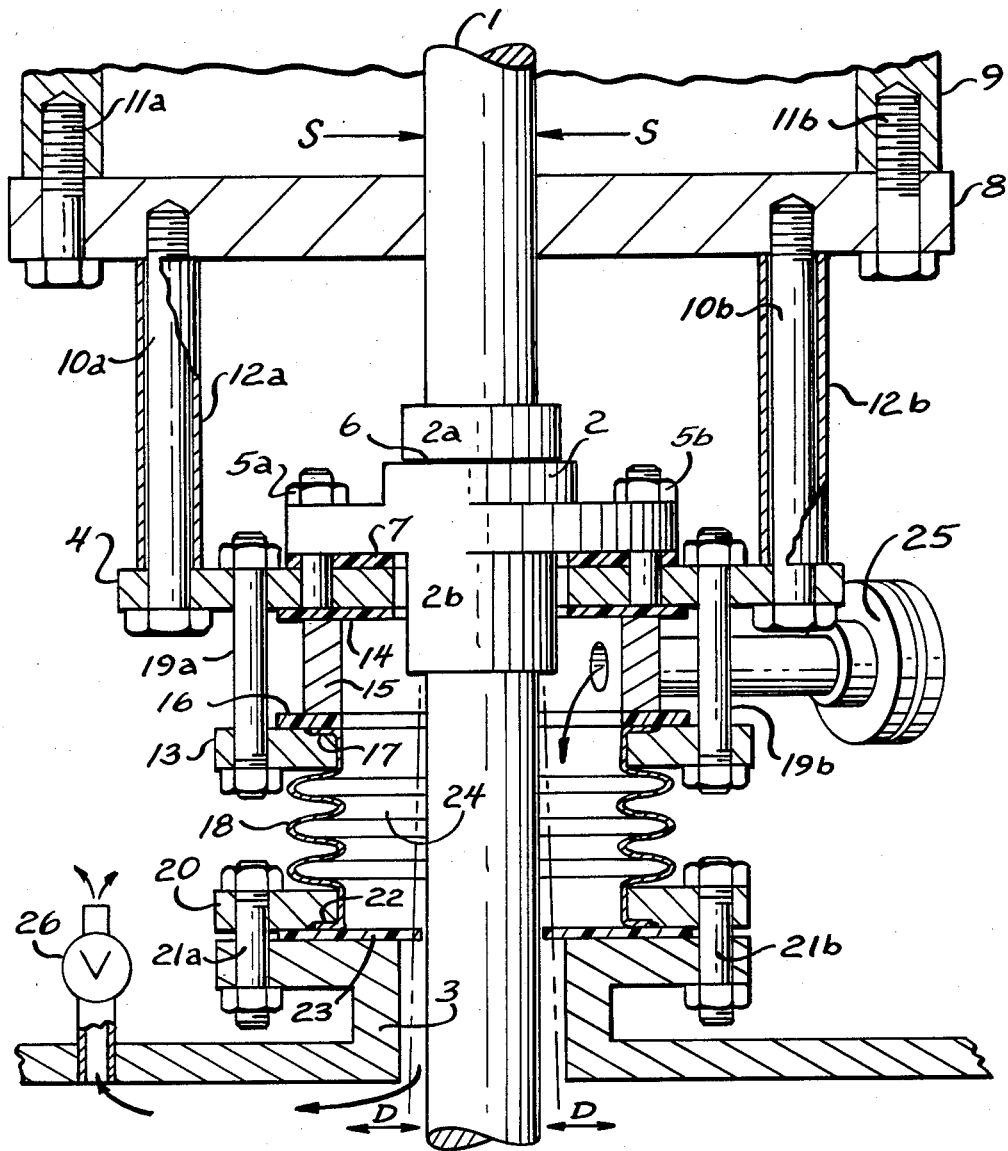
FIG. 1 is a cross-section view of the apparatus of the present invention installed on an agitator shaft and tank nozzle.

Referring to FIG. 1, a rotable shaft means 1 passes through a conventional mechanical seal means 2, and through a barrier means 3 such as an equipment housing, a boat hull, a tank nozzle, or the like.

Mechanical seal means 2, shown schematically, comprises a rotatable seal portion 2a attached to the rotatable shaft means 1 and a stationary seal portion 2b attached to a seal mounting plate 4 by a set of bolts 5a and 5b. As shown schematically in FIG. 1, a seal is effected when the face of the rotating seal portion 2a and the adjacent face of the stationary seal portion 2b meet at seal faces 6. Mechanical seal means 2 is conventional, is known in the art and per se forms no part of this invention.

Seal mounting plate 4 is separated from stationary seal portion 2b by a gasket 7. Seal mounting plate 4 is rigidly anchored to a seal adapter plate 8 by a set of bolts 10a and 10b. Seal adaptor plate 8 is attached to a stationary shaft drive means housing 9 by a set of bolts 11a and 11b. Bolts 10a and 10b are covered by a respective set of spacer tubes 12a and 12b which maintain a fixed distance between seal adapter plate 8 and seal mounting plate 4.

Seal mounting plate 4 and a top flange 13 are separated by a gasket 14, a flushing tee 15, a gasket 16 and a first flanged lip 17 of an elastomeric bellows 18. Seal mounting plate 4 is attached to top flange 13 by a set of bolts 19a and 19b. Top flange 13 and a bottom flange 20 are connected by elastomeric bellows 18. Bottom flange 20 is attached to barrier means 3 by a set of bolts 21a and 21b. Bottom flange 20 and barrier means 3 are separated by a second flanged lip 22 of elastomeric bellows 18 and a gasket 23. Gasket 23 extends toward, is close to, but is not in contact with rotatable shaft means 1.

Gaskets 7, 14, 16 and 23 are typically flurocarbon envelope gaskets. Alternatively, the gaskets could be an elastomer or solid teflon. Elastomeric bellows 18 is a corrosion-resistant elastomeric expansion joint such as those manufactured by Resistoflex Corporation of Roseland, N.J.

Flushing tee 15 is made of flurocarbon-lined metal such as the carbon steel or iron instrument tees lined with Teflon manufactured by Resistoflex Corporation of Roseland, N.J.

Figure 2:
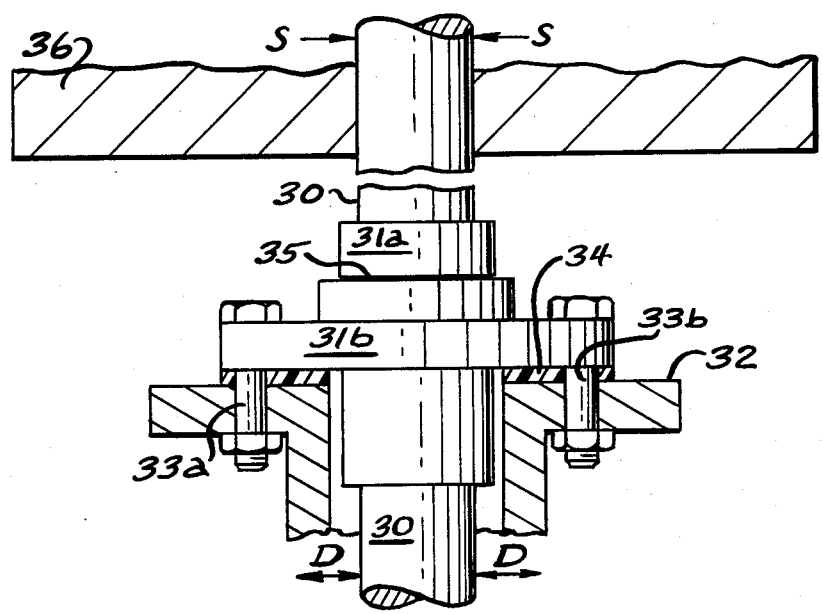
FIG. 2 is a cross-section view of a conventional mechanical seal installed on an agitator shaft and tank nozzle, is included for comparison purposes, and does not depict the present invention.

Referring now to FIG. 2, for comparison, a rotatable shaft 30 passes through a conventional mechanical seal means 31 and through an agitated tank nozzle 32. Mechanical seal means 31, shown schematically, comprises a rotatable seal portion 31a attached to a rotatable shaft 30 and a stationary seal portion 31b attached to agitated tank nozzle 32 by a set of bolts 33a and 33b. Tank nozzle 32 is separated from mechanical seal means 31 by a gasket 34. As shown schematically in FIG. 2, a seal is effected where the adjacent faces of rotatable seal portion 31a and stationary seal portion 31b meet at seal faces 35. Shaft 30 is rotated by a shaft drive means housing 36.

In FIG. 2 seal faces 35 of mechanical seal means 31 are conventionally insulated from the separating forces of axial and radial motion of shaft 30 or nozzle 32 by the one or more internal springs (not shown) of mechanical seal means 31, by the tolerance provided by the surface area of the seal faces 6, and minimally by the elastomericity of gasket 34.

In FIG. 1 seal faces 6 of mechanical seal means 2 are insulated from the separating forces of axial and radial motion of shaft means 1 or barrier means 3 by the one or more internal springs (not shown) of mechanical seal means 2, the tolerance provided by the surface area of seal faces 6, and the elastomericity of gasket 7. In addition, by employing the apparatus of the present invention, seal faces 6 of mechanical seal means 2 are insulated from the separating forces of axial and radial motion of shaft means 1 or barrier means 3 minimally by the elastomericity of gaskets 7, 14, 16 and 23, by the elastomericity of flushing tee 15, and most substantially by elastomeric bellows 18.

Where barrier means 3 in FIG. 1 or tank nozzle 32 in FIG. 2 is the nozzle of a non-rigid, agitated tank made of, for example, fiberglass reinforced plastic, the tank and nozzle often wobble during agitation. In FIG. 2 the force of such combined axial and radial tank motion will force the seal faces 35 apart if it exceeds the tolerance of mechanical seal means 31. In the apparatus and method of the present invention, as shown in FIG. 1, mechanical seal means 2 is not rigidly attached to barrier means 3, but rather is flexibly attached to barrier means 3 by elastomeric bellows 18. The axial and radial tank motion is absorbed by elastomeric bellows 18. Mechanical seal means 2 is self-centered because it is mounted on shaft means 1 independent of barrier means 3.

In a first preferred embodiment of the present invention gasket 23, elastometric bellows 18, first flanged lip 17, second flanged lip 22, gasket 16, flushing tee 15, gasket 14 and mechanical seal means 2 comprise the walls of a substantially fluid-tight chamber 24. Flushing tee 15 and a flange 25 of flushing tee 15 provide means for flushing the fluid-tight chamber with flushing a fluid to protect mechanical seal means 2 from exposure to the barred fluid.

In a second preferred embodiment of the invention the pressure of the flushing fluid in chamber 24 is maintained at a level greater than a pressure of the barred fluid. Any barred fluid such as corrosive chemicals escaping via barrier means 3 into chamber 24 is flushed back through the barrier means 3 before it can contact mechanical seal means 2. If the barrier means 3 is an agitated tank, the flushing fluid flowing into the tank is vented through a vent-hole 26 in the tank.

In FIG. 2, if the barrier means 32 is a tank containing a corrosive barred fluid, the lower outer surfaces of stationary seal portion 31b are exposed to the corrosive fluid and must be made of corrosion-resistant material. In FIG. 1 stationary seal portion 2b is not exposed to corrosives because substantially fluid-tight chamber 24 and flushing tee 15 provide means for flushing barred fluid away from the mechanical seal means 2.

The flushing fluid can be any fluid which is non-reactive with the barred fluid and non-reactive with the walls of the chamber. For example, if the barrier means is an agitated tank, nitrogen gas may be used as the flushing fluid so long as nitrogen gas does not adversely affect the fluid agitated in the tank. A fluid which would corrode the walls of the chamber, including portions of the mechanical seal means, would not be an appropriate flushing fluid.

Generally any rotable shaft is most stable and most able to resist radial deflective forces at the point where it is in direct contact with a stationary shaft drive means housing. A shaft is less stable and more susceptible to deflective forces at points further away from the shaft drive means. Accordingly, a mechanical seal should be mounted on a shaft as close to the stationary shaft drive means housing as possible to take advantage of the stability of the stationary shaft drive means.

In FIGS. 1 and 2 the stationary shaft drive means housing 9 and 36 provide a stabilizing force S which enables shaft means 1 and shaft 30 respectively to resist radial deflective forces D. The extent to which stabilizing force S enables shaft means 1 and shaft 30 to resist deflective forces D at any given point along shaft means 1 and shaft 30 decreases as the distance between the stabilizing force S in the stationary shaft drive means housing 9 and 36 and that point increases.

In FIG. 2 if rotable shaft 30 is subject to radially deflective forces D, and if mechanical seal means 31 is installed on shaft 30 so far from shaft drive means 36 and stabilizing force S, the stabilizing force S is insufficient to enable shaft 30 to resist deflective forces D. Shaft 30 moves radially and seal faces 35 are forced apart.

In a third preferred embodiment of the present invention, as shown in FIG. 1, if shaft means 1 is subject to radially deflective forces D, mechanical seal means 2 is installed on shaft means 1 close enough to stationary shaft drive means housing 9 and stabilizing force S that the stabilizing force S is sufficient to enable shaft means 1 to resist deflective forces D.

Rotatable portion 2a of mechanical seal means 2 is stabilized by force S of stationary shaft drive means housing 9 because the mechanical seal means 2 is mounted close to stationary shaft drive means housing 9. For example, if this embodiment of the present invention is employed in sealing a six thousand gallon agitated tank where the rotatable shaft is sixteen feet long and six inches in diameter, the distance from the mechanical seal to the stationary shaft drive means housing is about eight inches, and the distance from the tank nozzle to the stationary shaft drive means housing is about two feet. Whereas, in sealing the same tank without employing the present invention, the distance from the mechanical seal to the stationary shaft drive means housing is typically two or more feet.

Stationary portion 2b of mechanical seal means 2 will be stabilized relative to rotatable portion 2a if stationary portion 2b can be stabilized by the stationary shaft drive means housing 9. Accordingly, in a fourth preferred embodiment of the present invention stationary portion 2b is rigidly anchored to stationary shaft drive means housing 9 via seal mounting plate 4, bolts 10a and 10b, seal adaptor plate 8 and bolts 11a and 11b. As one skilled in the art will recognize any method of rigidly anchoring the stationary portion 2b to stationary shaft drive means housing 9 may be employed.

The third and fourth foregoing preferred embodiments are combined to comprise a fifth preferred embodiment. That is, by anchoring the stationary portion 2b to shaft drive means 9 and simultaneously stabilizing rotatable portion 2a of mechanical seal means 2 relative to stationary shaft drive means housing 9 and shaft means 1, the tolerance of mechanical seal means 2 for radial motion and its ability to be self-centering is enhanced beyond the tolerance afforded by the use of the invention of either embodiment separately.

Figure 3:
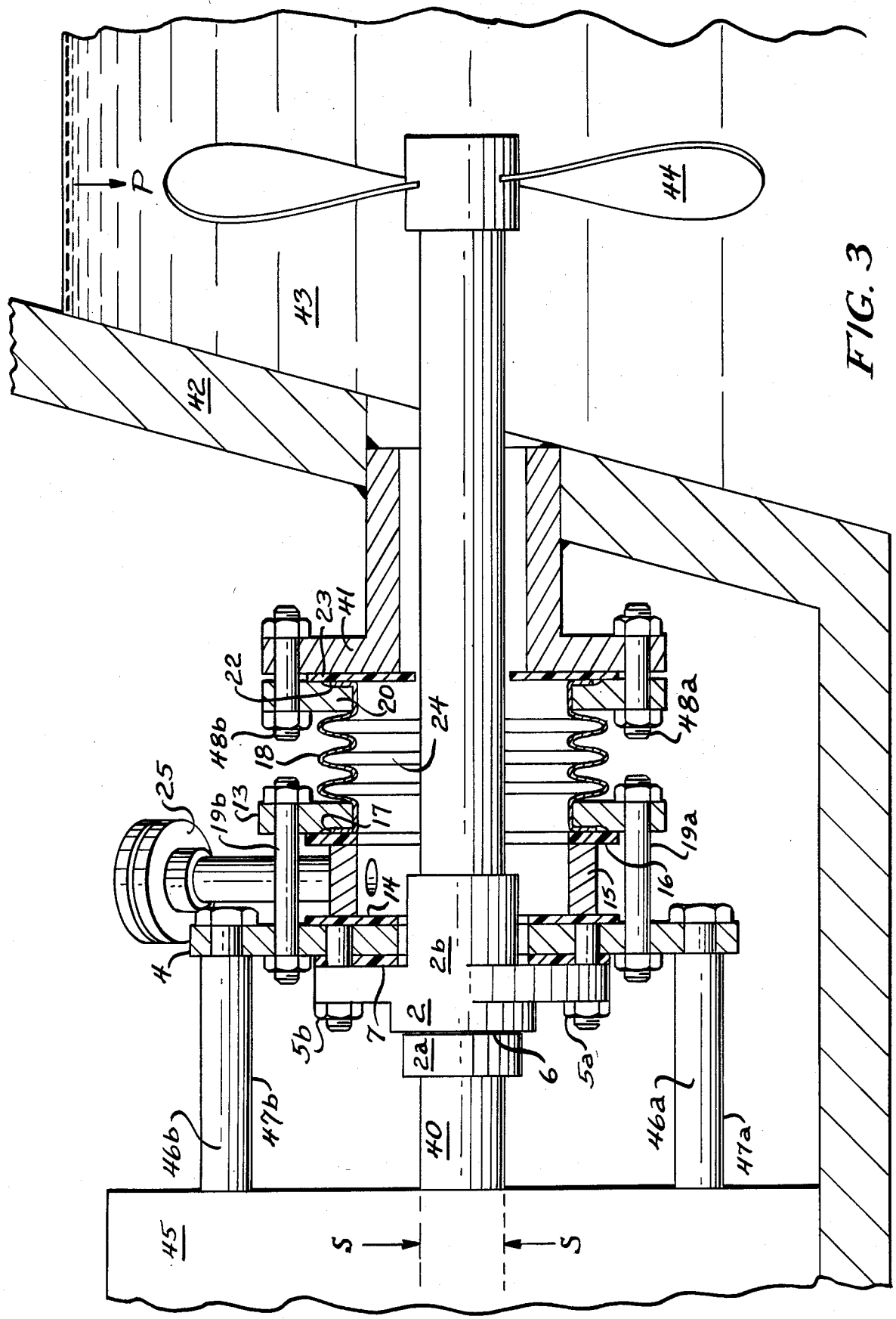
FIG. 3 is a cross-section view of the apparatus of the present invention installed on a propellor shaft through a boat hull.

Referring now to FIG. 3, a rotatable propeller shaft 40 passes through a mechanical seals means 2, through a boat hull flange 41, and through a boat hull 42, to a body of water 43 through which the hull is propelled by a propeller 44. Mechanical seal means 2, shown schematically, comprises a rotatable seal portion 2a attached to the rotatable propeller shaft 40 and a stationary seal portion 2b attached to a seal mounting plate 4 by a set of bolts 5a and 5b. As shown schematically in FIG. 3, a seal is effected when the face of the rotatable seal portion 2a and the adjacent face of the stationary seal portion 2b meet at seal faces 6. Seal mounting plate 4 is separated from stationary seal portion 2b by a gasket 7. Seal mounting plate 4 is rigidly anchored to a propeller stationary shaft drive means housing 45 by a set of bolts 46a and 46b. Bolts 46a and 46b are covered by a respective set of spacer tubes 47a and 47b which maintain a fixed distance between seal mounting plate 4 and propeller stationary shaft drive means housing 45. Seal mounting plate 4 and a top flange 13 are separated by a gasket 14, a flushing tee 15, a gasket 16 and a first flanged lip 17 of an elastomeric bellows 18.

Seal mounting plate 4 is attached to top flange 13 by a set of bolts 19a and 19b. Top flange 13 and a bottom flange 20 are connected by elastomeric bellows 18. Bottom flange 20 is attached to the boat hull flange 41 by a set of bolts 48a and 48b. Bottom flange 20 and boat hull flange 41 are separated by a second flanged lip 22 of elastomeric bellows 18 and a gasket 23. Gasket 23 extends toward, is close to, but is not in contact with rotatable propeller shaft 40.

Gasket 23, elastomeric bellows 18, first flanged lip 17, second flanged lip 22, gasket 16, flushing tee 15, gasket 14 and mechanical seal means 2 comprise the walls of a substantially fluid-tight chamber 24.

A flange 25 of flushing tee 15 provides an inlet and control valve for flushing the fluid-tight chamber with a fluid, such as air or water. Any water, or water-borne particles entering chamber 24 via boat hull 42 and boat hull flange 41 are flushed back into the body of water 43 and are prevented from contacting mechanical seal 2 by flushing the chamber 24 with air or water. The pressure of the fluid in chamber 24 is maintained at a level greater than a pressure P of the body of water 43 through which the hull 42 is propelled. Pressure P would depend primarily upon the depth of the propeller 44 in the body of water 43 and any back pressure created by propeller 44.

In FIG. 3 seal faces 6 of mechanical seal means 2 are insulated from the separating forces of axial and radial motion of propeller shaft 40 minimally by one or more internal springs (not shown) of mechanical seal means 2, the tolerance provided by the surface area of seal faces 6, the elastomericity of gaskets 7, 14, 16 and 23, the elastomericity of flushing tee 15, and most substantially by elastomeric bellows 18.

In FIG. 3 seal faces 6 of mechanical seal means 2 are additionally insulated from separating forces because rotatable portion 2a and stationary portion 2b are both stabilized by propeller stationary shaft drive means housing 45. Rotatable portion 2a is stabilized by propeller stationary shaft drive means housing 45 because it is attached to propeller shaft 40 close to propeller stationary shaft drive means housing 45. Stationary portion 2b is stabilized because it is rigidly anchored to propeller stationary shaft drive means housing 45 via bolts 46a, 46b, seal adapter plate 4, and bolts 5a and 5b. Mechanical seal means 2 is self-centered because it is mounted on propeller shaft 40 independent of boat hull 42.

In FIG. 3, if the hull 42 is propelled through a body of salt water, outer surfaces of stationary portion 2b of mechanical seal means 2 are not exposed to corrosion by the salt because substantially fluid-tight chamber 24 and flushing tee 15 provide means for protecting mechanical seal means 2 from the salt water by flushing chamber 24 with a fluid such as air or water.

Those skilled in the art will realize that while bolts 5a, 5b, bolts 10a, 10b, spacer tubes 12a, 12b, bolts 19a, 19b, and bolts 21a, 21b in FIG. 1, and bolts 33a, 33b in FIG. 2, and bolts 5a, 5b, bolts 46a, 46b, spacer tubes 47a, 47b, bolts 19a, 19b, and bolts 48a, 48b in FIG. 3 are represented as pairs, in actual practice a set of at least three rather than a pair would be used.

While the foregoing embodiments are intended to illustrate a novel apparatus and method for sealing the aperture where a rotatable shaft passes through a barrier into a barred fluid, they are not intended nor should they be construed as limitations on the invention. As one skilled in the art would understand, many variations and modifications of these embodiments may be made which fall within the spirit and scope of this invention.

What is claimed is:

1. An apparatus for forming a seal at an aperture where a rotatable shaft means passes through a barrier means into a barred fluid, and where the rotatable shaft means is rotatable by a shaft drive means contained within a stationary shaft drive means housing, comprising:

mechanical seal means located between said stationary shaft drive means housing and said barrier mean, said mechanical seal means having at least one stationary portion sealingly positioned adjacent to at least one rotatable portion, the rotatable portion being attached to the rotatable shaft means for rotation therewith, and elastomeric joint means joining the stationary portion of the mechanical seal means to the barrier means thereby forming a substantially fluid-tight chamber bounded by the mechanical seal means, the elastomeric joint means and the barrier means, whereby the elastomeric joint means is adapted to absorb relative radial and axial motion between the barrier means and the rotatable shaft means, and means for rigidly anchoring the stationary portion to the stationary shaft drive means housing.

2. The apparatus of claim 1 and further comprising:
means for attaching the rotatable portion to the rotatable shaft means at such a distance from the stationary shaft drive means housing that the resistance of the rotatable shaft means to radial deflection is substantially at a maximum.

3. The apparatus of claim 2 and further comprising: means for continuously flushing the chamber with a flushing fluid.

4. The apparatus of claim 3 wherein the means for continuously flushing the chamber is adapted to maintain the flushing fluid at a pressure greater than a pressure of the barred fluid and wherein the means for continuously flushing the chamber is adapted to flush the flushing fluid from the chamber through the barrier means into the barred fluid.

5. The apparatus of claim 4 wherein the flushing fluid is non-reactive with the barred fluid and non-reactive with the chamber.

6. The apparatus of claim 4 wherein the flushing fluid is air.

7. The apparatus of claim 4 wherein the barrier means is an agitated tank, wherein the barred fluid is corrosive, wherein the rotatable shaft means is an agitator shaft and wherein the flushing fluid is nitrogen gas.

8. The apparatus of claim 4 wherein the barrier means is the hull of a vessel, wherein the barred fluid is a body of water through which the vessel is propelled, wherein the rotatable shaft means is a propeller shaft, and wherein the flushing fluid is air.

9. The apparatus of claim 8 wherein the flushing fluid is water.

10. The apparatus of claim 2 wherein the barrier means is the hull of a vessel, wherein the barred fluid is a body of water through which the vessel is propelled, and wherein the rotatable shaft means is a propeller shaft.

11. The apparatus of claim 1 and further comprising: means for continuously flushing the chamber with a flushing fluid.

12. The apparatus of claim 11 wherein the means for continuously flushing the chamber is adapted to maintain the flushing fluid at a pressure greater than a pressure of the barred fluid and wherein the means for continuously flushing the chamber is adapted to flush the flushing fluid from the chamber through the barrier means into the barred fluid.

13. A method for forming a seal at an aperture where a rotatable shaft means passes through a barrier means into a barred fluid, and where the rotatable shaft means is rotatable by a shaft drive means contained within a stationary shaft drive means housing, comprising the steps of:
mounting at least one rotatable portion of a mechanical seal means on the rotatable shaft means for rotation therewith at a location between said stationary shaft drive means housing and said barrier means,
sealingly positioning at least one stationary portion of the mechanical seal means adjacent to the rotatable portion, and
elastomerically joining the stationary portion of the mechanical seal means to the barrier means with an elastomeric joint means to form a substantially fluid-tight chamber bounded by the mechanical seal means, the elastomeric joint means and the barrier means whereby the elastomeric joint means is adapted to absorb relative radial and axial motion between the barrier means and the rotatable shaft means,
rigidly anchoring the stationary portion of the mechanical seal means to the stationary shaft drive means housing, and
mounting said rotatable portion of the mechanical seal means on the rotatable shaft means for rotation therewith at such a distance from the stationary shaft drive means housing that the resistance of the rotatable shaft means to radial deflection is substantially at a maximum.

14. The method of claim 13 and further comprising the step of:
continuously flushing the chamber with a flushing fluid.

15. The method of claim 14 and further comprising the steps of:
maintaining the flushing fluid at a pressure greater than a pressure of the barred fluid, and
flushing the flushing fluid from the chamber through the barrier means into the barred fluid.

16. The method of claim 15 wherein the barrier means is an agitated tank, wherein the rotatable shaft means is an agitator shaft, wherein the barred fluid is a corrosive, and wherein the flushing fluid is non-reactive with the barred fluid and non-reactive with the chamber.

17. The method of claim 15 wherein the barrier means is a vessel hull, wherein the rotatable shaft means is a propeller shaft, wherein the barred fluid is a body of water through which the hull is propelled, and wherein the flushing fluid is air.

* * * * *